(12) United States Patent
Hoshizawa et al.

(10) Patent No.: US 7,010,502 B1
(45) Date of Patent: Mar. 7, 2006

(54) SYSTEM AND METHOD FOR KEEPING CONSUMABLE ITEMS IN AN IMAGE FORMING APPARATUS

(75) Inventors: Takafumi Hoshizawa, Yokohama (JP); Shunichi Akabane, Misato (JP); Tadashi Yamazaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 595 days.

(21) Appl. No.: 09/619,672

(22) Filed: Jul. 19, 2000

(30) Foreign Application Priority Data

Jul. 19, 1999 (JP) ................................. 11-204774

(51) Int. Cl.
G06F 17/60 (2006.01)

(52) U.S. Cl. .............................. 705/26; 399/24; 399/27

(58) Field of Classification Search ................. 705/26, 705/27, 28; 399/8, 24, 27, 53, 81, 25, 26, 399/28, 29, 30
See application file for complete search history.

(56) References Cited

U.S. PATENT DOCUMENTS

| | | | | |
|---|---|---|---|---|
| 5,077,582 | A | * | 12/1991 | Kravette et al. ................ 399/8 |
| 5,305,199 | A | * | 4/1994 | LoBiondo et al. ............. 705/28 |
| 5,335,048 | A | * | 8/1994 | Takano et al. .................. 399/8 |
| 5,594,529 | A | * | 1/1997 | Yamashita et al. .............. 399/8 |
| 5,606,403 | A | * | 2/1997 | Kikuchi et al. ................ 399/53 |
| 5,608,643 | A | | 3/1997 | Wichter et al. |
| 5,685,653 | A | * | 11/1997 | Bringhurst ................... 400/197 |
| 5,708,223 | A | | 1/1998 | Wyss |
| 5,983,200 | A | * | 11/1999 | Slotznick ...................... 705/26 |
| 6,333,790 | B1 | * | 12/2001 | Kageyama ................. 358/1.15 |

FOREIGN PATENT DOCUMENTS

EP 0685 786 * 2/1995

OTHER PUBLICATIONS

"Never Before in History" Jeffrey R. Harrow. Feb. 8, 1999. RFCoC—Technology Journal.*
"HP rewrites the rules for office desktop printers" Apr. 20, 1998. Business Wire.*
"RFoC—Technology Journal. Now Where Did I Put That Can of Soup" (Harrow, Jeffrey. Feb. 8, 1999).*
"HP Rewrites the Rules for Office Desktop Printers" (Apr. 20, 1998).*
"Supplies Affect Copier Operation", William, Cowan; Office Systems; Jul. 1991; vol. 8, issue 7; p. 42 (2 pages).*

* cited by examiner

*Primary Examiner*—James McClellan
*Assistant Examiner*—M. Thein
(74) *Attorney, Agent, or Firm*—Oblon, Spivak, McClelland, Maier & Neustadt, P.C.

(57) ABSTRACT

A consumable item keeping system and method wherein a consumable item keeping apparatus stores a variety of consumable items at a user side, and a consumable item supplying section is connected to the consumable item keeping apparatus via a communication circuit and supplies a variety of consumable items to the user side upon request. A consumable item replenishment level setting device sets a consumable item replenishment level for consumable items stored in the consumable item keeping apparatus and a signal generating device generates a signal indicative of arrival of the consumable items at the consumable item replenishment level. Further, a consumable item data transmitting device transmits order data indicating request for consumable items to be replenished to the consumable item supplying section via the communication circuit when the signal is generated in the consumable item keeping apparatus.

17 Claims, 3 Drawing Sheets

FIG. 3

| (1) Ordering Day & Time | (2) User Code | (3) Kind of Consumable Item | (4) Size of Consumable Item | (5) Amount of Ordered Consumable Items |
|---|---|---|---|---|

FIG. 4

| (1) Consumable Item Distributing Day & Time | (2) Delivery Data |
|---|---|

SYSTEM AND METHOD FOR KEEPING CONSUMABLE ITEMS IN AN IMAGE FORMING APPARATUS

CROSS REFERENCE TO RELATED APPLICATIONS

This application claims priority under 35 USC §119 to Japanese Patent Application No. 11-204774 filed on Jul. 19, 1999, the entire contents of which are incorporating reference herein.

BACKGROUND OF THE INVENTION

1. Field of the Invention

The present invention relates in general to a system and method for keeping consumable items, such as sheets and toner in an image forming apparatus, such as a copier, a facsimile and a printer.

2. Discussion of the Background

A conventional image forming apparatus generally stops its operation when running low on a consumable item when the consumable item is not promptly replenished. In a modern automated office, the business of the office can considerably be influenced when an image forming apparatus is even briefly out of operation. Then, to promptly replenish consumable items, the Japanese Patent Application Laid Open Number 11-3005 proposes a copier kept supplied with consumable items by providing the copier with a communication function and connecting the copier with a host computer via a communication circuit. In fact, it is indeed possible to constitute a system for keeping consumable items by using the above-mentioned copier having a communication function.

However, it is impossible to constitute a system capable of executing inventory control of consumable items at a user side if no communication function is provided. In that case, the image forming apparatus does not operate in the case when its display indicates a shortage of a consumable item and the consumable item is not replenished.

Further, a working down time is continued until consumable items are delivered after a user has ordered replenishment.

SUMMARY OF THE INVENTION

Accordingly, an object of the present invention is to provide a novel consumable item keeping method and system in which supply of consumable items are maintained and down time due to consumable item depletion is reduced. To that end, the present invention provides a consumable item keeping method and system wherein a consumable item keeping apparatus stores a variety of consumable items at a user side, a consumable item supplying section is connected to the consumable item keeping apparatus via a communication device and supplies a variety of consumable items to a user upon request, a consumable item replenishment level setting device sets a consumable item replenishment level for the consumable item keeping apparatus, a consumable item replenishment signal generating device generates a signal indicative of arrival of the consumable items at the consumable item replenishment level, and a consumable item order data transmitting device transmits via the communication circuit order data indicating a request for consumable items to be replenished to the consumable item supplying section, when the consumable item replenishment signal is generated.

According to the present invention, a user can optionally set a consumable item replenishment level.

Further according to the present invention, a kind of the consumable items arriving at the consumable item replenishment level is detected and its data is included in the order data.

Further according to the present invention, the order data is transmitted only when said signal is continuously sensed for a prescribed time period.

Further according to the present invention, the order data is reset when the signal disappears before a prescribed time period has elapsed.

Further according to the present invention, a determining device configured to determine both a kind of an amount of consumable items to be distributed from the consumable item supplying section to a user according to the order data is provided in the consumable item supplying section.

Further according to the present invention, a delivery data transmitting device configured to transmit delivery data of the consumable item to be distributed is provided in the consumable item supplying section.

Further according to the present invention, the delivery data includes information of a day when consumable item distribution is commenced by the consumable item supplying section.

Further according to the present invention, the delivery data includes information of a day when consumable item is scheduled to be delivered to a user.

Further according to the present invention, the consumable item is used in an image forming apparatus installed in a user side.

Further according to the present invention, the communication circuit includes a wireless system.

Further according to the present invention, the inventory-detecting device is employable regardless of a model and manufacturer of the image forming apparatus.

Further according to the present invention, the delivery data is displayed on a display at the user side.

BRIEF DESCRIPTION OF THE DRAWINGS

A more complete appreciation of the present invention and many of the attendant advantages thereof will be readily obtained as the same becomes better understood by the following detailed description when considered in connection with the accompanying drawings, wherein:

FIG. 3 is a diagram illustrating one example of contents of consumable item order data; and FIG. 4 is a diagram illustrating one example of contents of delivery data transmitted from a consumable item-supplying center.

DESCRIPTION OF THE PREFERRED EMBODIMENTS

Figure 1:
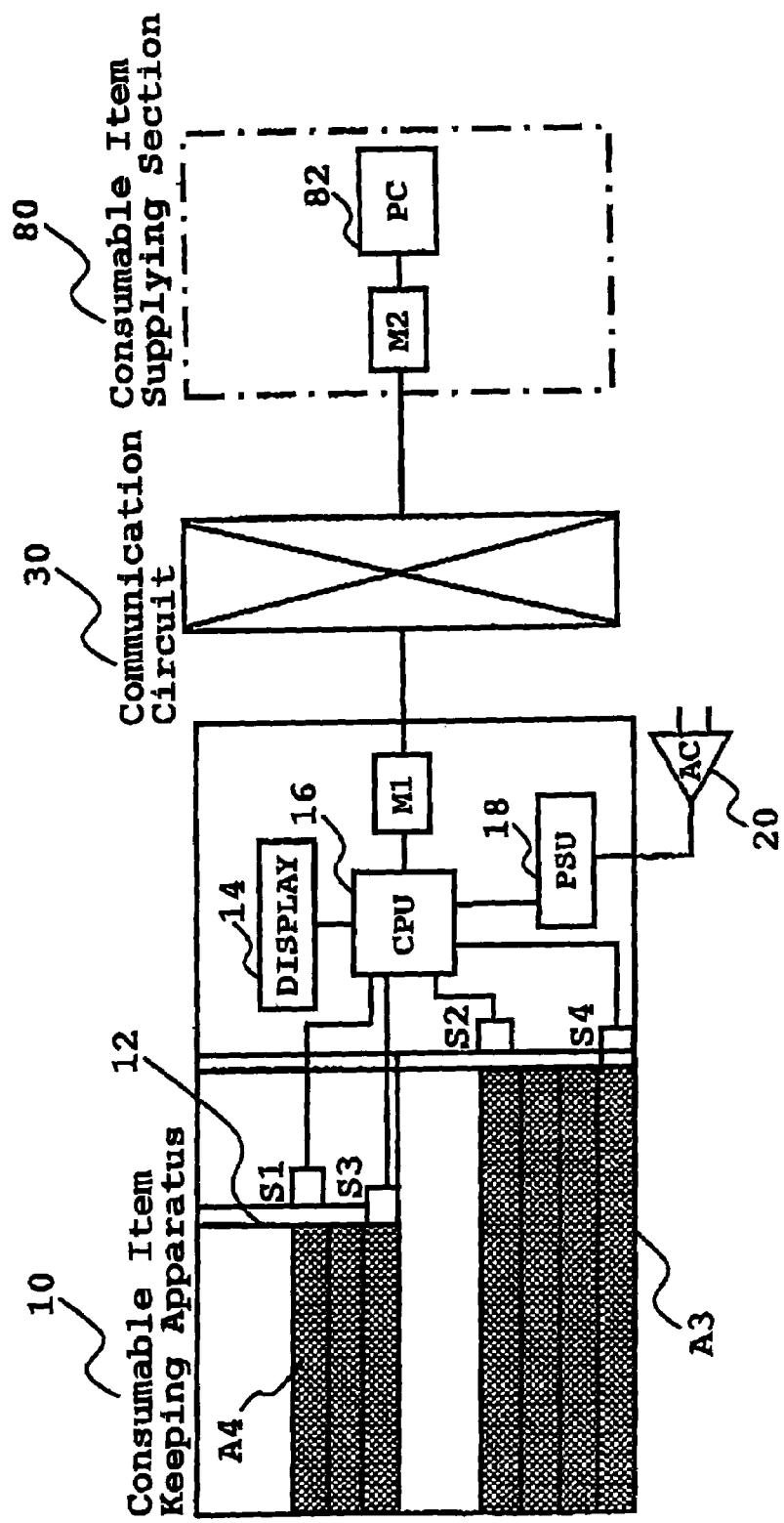
FIG. 1 is a schematic block diagram illustrating a consumable item keeping system of one embodiment of the present invention.

Referring now to the drawing, wherein like reference numerals designate identical or corresponding parts throughout several views, and more particularly to FIG. 1 thereof, FIG. 1 is a schematic block diagram illustrating a consumable item keeping system according to one embodiment of the present invention. The consumable item keeping system includes a consumable item keeping apparatus 10, a communication circuit 30, a consumable item supply section 80, a plurality of consumable item replenishment level detecting sensors S1 and S2, a plurality of (sheet) size detecting sensors S3 and S4, and stacks of different sized sheets, such A4 and A3 standard sheets. A side guide plate 12, a display 14, and a CPU (Central Processing Unit) 16 are also included.

Further, a MODEM (Modulation/Demodulation) M1, a PSU (Power Supply Unit) 18, and an AC (power supply) 20 are also included. The consumable item replenishment level detecting sensors S1 and S2 can be photo-sensors (a distance detecting type and a reflection detecting type or the like), pressure sensors, or micro-switches or the like.

The consumable item replenishment level, e.g., a position of the sensor, can be preset at a prescribed value when a consumable item keeping apparatus is initially installed. A user can adjust the position of the sensor, so that a level of replenishment can be adjusted corresponding to intent of the user. Accordingly, as consumable items reach a consumable item replenishment level, namely a remaining amount decreases to a prescribed level, a signal indicative of replenishment of consumable items is generated and transmitted to the CPU 16.

Sheet size detecting sensors S3 and S4 may also be photo-sensors (a distance-detecting type and a reflection-detecting type or the like). The sheet size detecting sensors S3 and S4 may detect the width of consumable items at a position where the side guide plate 12 is attached, and may transmit size data to the CPU 16. A user can move and adjust the side guide plate 12 at a prescribed position to match it with the width of the consumable items. Thus, the side guide plate 12 may function to secure the consumable item at a prescribed position. The display 14 may display consumable item ordering day and time, and delivery day and time, so that the user can use the information when confirming a delivery status. A liquid crystal type display panel can be utilized as the display 14.

The CPU 16 may monitor both inventory state data and order/delivery data. As a monitoring operation, the CPU 16 may determine that consumable item is required and transmit consumable item order data to M1, when continuously receiving a consumable item replenishment signal for a prescribed detection time period from one of the sensors S1 and S2. A suer can optionally set such a detecting time period. At that time, the CPU 16 may detect size data and an ordering amount of the consumable item sent from the sensors S3 and S4.

Since types of consumable item may be related to the sensors S1 and S2, the type of the consumable item to be replenished can be determined based on the consumable item replenishment signal sent from the sensors S1 and S2. The CPU 16 may generate a user list with user code. To monitor order/delivery data, both order data and delivery data are monitored and displayed on the display 14. The MODEM (Modulation/Demodulation) M1 may transfer the order data of the consumable item receiving from the CPU 16, acting as a communication control section, toward the communication circuit 30.

The consumable item supplying section 80 may be provided with a PC (personal computer) 82 and a MODEM M2, may have a service person deliver consumable items to a user based on order data, and may automatically transmit data of scheduled delivery to the user. The PC 82 may be a consumable item supplying section host computer, and may give the service person delivery instructions specifying a type and size of the consumable items and user code when receiving the order data of the consumable items. Further, it may transmit the delivery data to the MODEM 2, which may transmit the delivery data from the consumable item supplying section 80 to the communication circuit 30. The communication circuit 30 may utilize either a private use line or a public circuit network including a wireless circuit, such as a PHS (Personal Phone System).

Since the consumable item keeping apparatus 10 may be a private use apparatus, it can be applied regardless of a model and a manufacturer to an image forming apparatus, such as a copier, a facsimile, a printer and a duplicator, of a user.

An example of contents of order data used in the consumable item keeping apparatus 10 when monitoring both inventory status data and order/delivery data is illustrated in FIG. 3. The data may include day and time when order data is transmitted, user code as user information monitored by the CPU 16, information of a consumable item type also monitored by the CPU 16, size information of consumable items sent from the size detecting sensors S3 and S4, and information of an ordering amount of the consumable item.

Delivery data transmitted from the consumable item supplying section 80 are illustrated in FIG. 4. The data may include consumable item distribution day and time when distribution of consumable item to a user is commenced and delivery data indicating information of scheduled delivery date to a user.

Figure 2:
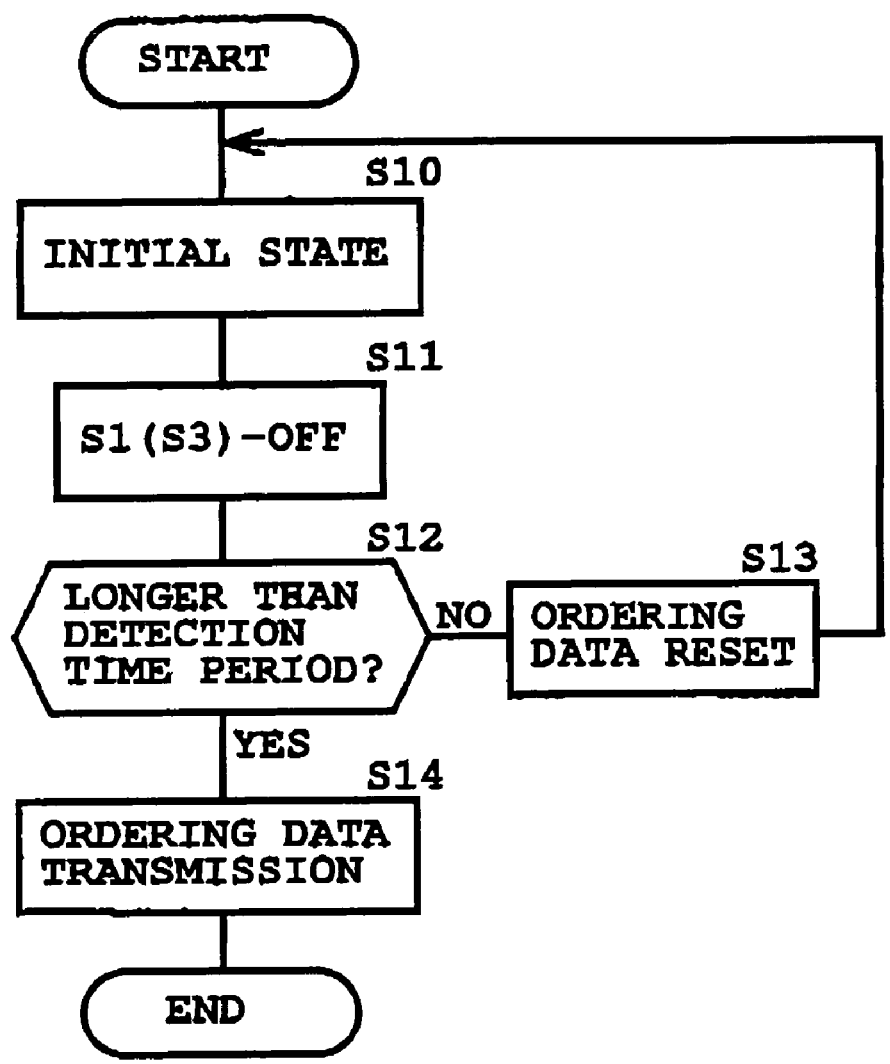
FIG. 2 is a flowchart illustrating one example of an operational procedure for dealing consumable item order data.

A procedure for dealing consumable item order data is now described referring to FIG. 2. Firstly, when inventory decreases from its initial condition as shown in step S10 and reaches the replenishment level, a consumable item-replenishment signal may be generated and transmitted by the consumable item replenishment level detecting sensor S1 to the CPU 16. The CPU 16 may then transmit consumable item order data to the consumable item supplying section 80 via the communication circuit 30, when the consumable item replenishment signal has been continuously sensed more than a prescribed time period set by a user (i.e., Yes in step S12).

If it is less than the time period (i.e., No in step S12), the order data may be reset in step S13 because it is recognized that the signal is erroneously generated and the consumable item inventory has not yet reached the replenishment level. The consumable item supplying section 80 having received the order data may deliver the applicable consumable items to the applicable user and transmit delivery data to the consumable item keeping apparatus 10 via the communication circuit 30.

The consumable item keeping apparatus 10 having received the delivery data may display the delivery data on the display 14 to notify the user. Thus, the user can confirm the delivery status through the display 14 by viewing the order day, the scheduled delivery day and the distribution day, and is capable of reminding the consumable item supplying section.

Numerous modifications and variations of the present invention are possible in light of the above teachings. It is therefore to be understood that within the scope of the appended claims, the present invention may be practiced otherwise that as specifically described herein.

What is claimed is:

1. A consumable item system, comprising:
   a consumable item apparatus configured to store a variety of consumable items for an image forming apparatus at the image forming apparatus;
   a consumable item supplying section configured to supply a variety of consumable items for the image forming apparatus to the image forming apparatus upon request, said consumable item supplying section being connected to the consumable item apparatus via a communication circuit;

at least a first sensor configured to detect that a corresponding consumable item in the image forming apparatus needs replenishment;

at least a second sensor configured to detect one of a type and a size of the corresponding consumable item needing replenishment in the image forming apparatus;

a consumable item replenishment signal generating device configured to generate a signal indicating said first sensor has detected the corresponding consumable item needs replenishment;

a detector configured to detect the signal generated by the generating device;

a counter configured to count a duration of a time period that said detector detects said signal, said duration of the time period being adjustably set at the image forming apparatus by a user input;

a consumable item order data transmitting device configured to transmit order data indicating a request for the corresponding consumable item that needs to be replenished to the consumable item supplying section via the communication circuit, when the signal is detected continuously by the detecting device for more than the duration of the time period set at the image forming apparatus by the user input; and a delivery data transmitting device included in the consumable item supplying section and configured to transmit delivery data of the corresponding consumable item from the consumable item supplying section to the image forming apparatus such that a delivery status of the corresponding consumable item to be replenished can be confirmed.

2. The consumable item system as claimed in claim 1, further comprising:

a data receiving device configured to receive the order data transmitted from the order data transmitting device.

3. The consumable item system as claimed in claim 1, wherein said delivery data includes information corresponding to a day when distribution of the corresponding consumable item is started by the consumable item supplying section and a day when the corresponding consumable item is scheduled to be delivered to the image forming apparatus.

4. The consumable item system as claimed in claim 1, wherein said communication circuit includes a wireless system.

5. The consumable item system as claimed in claim 1, wherein said consumable item system is employable regardless of a model and manufacturer of the image forming apparatus.

6. The consumable item system as claimed in claim 1, wherein said order data is reset when said signal disappears before said duration of the time period has elapsed.

7. The consumable item system as claimed in claim 1, wherein said consumable item data transmitting device is disposed at the image forming apparatus.

8. The consumable item system as claimed in claim 1, further comprising a data receiving device disposed at the consumable item supply section.

9. The consumable item system as claimed in claim 1, further comprising a display at the image forming apparatus on which said delivery data is displayed.

10. The consumable item system as claimed in claim 1, wherein the corresponding consumable item is a printing medium.

11. A method for keeping consumable items, comprising the steps of:

setting a consumable item replenishment level for a corresponding consumable item for an image forming apparatus stored in a consumable item apparatus at the image forming apparatus;

detecting that a corresponding consumable item in the image forming apparatus needs replenishment based on the setting step;

detecting one of a type and a size of the corresponding consumable item needing replenishment in the image forming apparatus;

generating a signal indicating replenishment of the corresponding consumable item has been detected;

detecting the signal generated in the generating step;

counting a duration of a time period that the generated signal is detected, said duration of the time period being adjustably set at the image forming apparatus by a user input;

transmitting order data indicating a request for the corresponding consumable item that needs to be replenished to a consumable item supplying section via a communication circuit, when the signal is continuously detected for more than the duration of the time period set at the image forming apparatus by the user input; and transmitting delivery data of the corresponding consumable item to be distributed from the consumable item supplying section to the image forming apparatus such that a delivery status of the corresponding consumable item to be replenished can be confirmed.

12. The consumable item method as claimed in claim 11, further comprising a step of:

displaying information of the delivery data at the image forming apparatus.

13. A consumable item system comprising:

consumable item means for storing a variety of consumable items for an image forming apparatus at the image forming apparatus;

consumable item supplying means for supplying a variety of consumable items for the image forming apparatus to the image forming apparatus upon request, said consumable item supplying means being connected to the consumable item means via communication means;

at least a first means for detecting that a corresponding consumable item in the image forming apparatus needs replenishment;

at least a second means for detecting one of a type and a size of the corresponding consumable item needing replenishment in the image forming apparatus;

signal generating means for generating a signal indicating said first means has detected the corresponding consumable item needs replenishment;

signal detecting means for detecting the signal generated by the signal generating means;

counting means for counting a duration of a time period that said detecting means detects said signal, said duration of the time period being adjustably set at the image forming apparatus by a user input;

consumable item order data transmitting means for transmitting order data indicating a request for the corresponding consumable item that needs to be replenished to the consumable item supplying means via the communication means, when the signal detecting means continuously detects the signal for more than the duration of the time period set at the image forming apparatus by the user input; and delivery data transmitting means included in the consumable item supplying means for transmitting delivery data indicating a consumable item distributing day and consumable item scheduled delivery day from the consumable item supplying means to the image forming apparatus such that a delivery status of the corresponding consumable items to be replenished can be confirmed.

14. The consumable item system as claimed in claim 13, further comprising:

displaying means for displaying the delivery data at the image forming apparatus.

15. A consumable item system, comprising:

a consumable item apparatus configured to store a variety of consumable items for an image forming apparatus at the image forming apparatus;

a consumable item supplying section configured to supply a variety of consumable items for the image forming apparatus to the image forming apparatus upon request, said consumable item supplying section being connected to the consumable item apparatus via a communication circuit;

at least a first sensor configured to detect that a corresponding consumable item in the image forming apparatus needs replenishment;

a consumable item replenishment signal generating device configured to generate a signal indicating said first sensor has detected the corresponding consumable item needs replenishment;

a detector configured to detect the signal generated by the generating device;

a counter configured to count a duration of a time period that said detector detects said signal, said duration of the time period being adjustably set at the image forming apparatus by a user input;

a consumable item order data transmitting device configured to transmit order data indicating a request for the corresponding consumable item that needs to be replenished to the consumable item supplying section via the communication circuit, when the signal is detected continuously by the detecting device for more than the duration of the time period set at the image forming apparatus by the user input;

a delivery data transmitting device included in the consumable item supplying section and configured to transmit delivery data of the corresponding consumable item from the consumable item supplying section to the image forming apparatus such that a delivery status of the corresponding consumable item to be replenished can be confirmed; and a display at the image forming apparatus on which said delivery data is displayed.

16. A method for keeping consumable items, comprising the steps of:

setting a consumable item replenishment level for a corresponding consumable item for an image forming apparatus stored in a consumable item apparatus at the image forming apparatus by a user input;

detecting that a corresponding consumable item in the image forming apparatus needs replenishment based on the setting step;

generating a signal indicating replenishment of the corresponding consumable item has been detected;

detecting the signal generated in the generating step;

counting a duration of a time period that the generated signal is detected, said duration of the time period being adjustably set at the image forming apparatus by a user input;

transmitting order data indicating a request for the corresponding consumable item that needs to be replenished to a consumable item supplying section via a communication circuit, when the signal is continuously detected for more than the duration of the time period set at the image forming apparatus by the user input;

transmitting delivery data of the corresponding consumable item to be distributed from the consumable item supplying section to the image forming apparatus such that a delivery status of the corresponding consumable item to be replenished can be confirmed; and displaying information of the delivery data at the image forming apparatus.

17. A consumable item system comprising:

consumable item means for storing a variety of consumable items for an image forming apparatus at the image forming apparatus;

consumable item supplying means for supplying a variety of consumable items for the image forming apparatus to the image forming apparatus, said consumable item supplying means being connected to the consumable item means via communication means;

at least a first means for detecting that a corresponding consumable item in the image forming apparatus needs replenishment;

signal generating means for generating a signal indicating said first means has detected the corresponding consumable item needs replenishment;

signal detecting means for detecting the signal generated by the signal generating means;

counting means for counting a duration of a time period that said detecting means detect said signal, said duration of the time period being adjustably set at the image forming apparatus by a user input;

consumable item order data transmitting means for transmitting order data indicating a request for the corresponding consumable item that needs to be replenished to the consumable item supplying means via the communication means, when the signal detecting means continuously detects the signal for more than the duration of the time period set at the image forming apparatus by the user input;

delivery data transmitting means included in the consumable item supplying means for transmitting delivery data indicating a consumable item distributing day and consumable item scheduled delivery day from the consumable item supplying means to the image forming apparatus such that a delivery status of the corresponding consumable items to be replenished can be confirmed; and display means for displaying the delivery data at the image forming apparatus.

* * * * *